(12) United States Patent
Kurz et al.

(10) Patent No.: US 7,953,146 B2
(45) Date of Patent: *May 31, 2011

(54) METHOD FOR WIRELESS DATA TRANSMISSION BETWEEN A BASE STATION AND A TRANSPONDER VIA INDUCTIVE COUPLING

(75) Inventors: Alexander Kurz, Schwaebisch Hall (DE); Mathew Neal, Pfaffing (DE)

(73) Assignee: Atmel Corporation, San Jose, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/705,012

(22) Filed: Feb. 12, 2007

(65) Prior Publication Data

US 2008/0031317 A1 Feb. 7, 2008

(30) Foreign Application Priority Data

Feb. 10, 2006 (DE) .......................... 10 2006 007 262

(51) Int. Cl.
*H03K 7/04* (2006.01)
(52) U.S. Cl. ...................................... 375/239
(58) Field of Classification Search .................. 375/259, 375/219, 224; 340/10.51, 10.2, 825, 10.34; 702/57, 64, 106; 455/41.1, 69, 39
See application file for complete search history.

(56) References Cited

U.S. PATENT DOCUMENTS

| | | | | |
|---|---|---|---|---|
| 4,975,654 A | * | 12/1990 | Becker et al. | 329/347 |
| 5,105,190 A | * | 4/1992 | Kip et al. | 340/10.34 |
| 5,491,471 A | * | 2/1996 | Stobbe | 340/5.61 |
| 5,543,798 A | * | 8/1996 | Schuermann | 342/42 |
| 6,044,333 A | | 3/2000 | Stobbe et al. | |
| 6,127,929 A | * | 10/2000 | Roz | 340/572.5 |
| 6,147,591 A | * | 11/2000 | Stobbe et al. | 340/10.51 |
| 6,882,826 B2 | | 4/2005 | Hedinger et al. | |
| 7,016,311 B2 | * | 3/2006 | Tiernay et al. | 370/252 |

(Continued)

FOREIGN PATENT DOCUMENTS

DE 197 44 781 A1 4/1999

(Continued)

OTHER PUBLICATIONS

Klaus Finkenzeller, "RFID Handbook," Fundamentals and Applications in Contactless Smart Cards and Identification, Second Edition, Chapter 3.2.1.2 (*Load Modulation*), pp. 42-47.

*Primary Examiner* — Shuwang Liu
*Assistant Examiner* — Helene Tayong
(74) *Attorney, Agent, or Firm* — Baker Botts L.L.P.

(57) ABSTRACT

A method and transponder for wireless data transmission between a base station and a transponder is provided by means of inductive coupling, the transponder supports a first data transmission protocol type and/or a second data transmission protocol type. In the first data transmission protocol type, the data transmission is ended when a maximum value for the duration between successive field gaps is exceeded and in the second data transmission protocol type, after the initiation of the data transmission a reference duration is transmitted by the base station, by means of which the calibration value is determined in the transponder, whereby the calibration value is used for calibrating subsequently received durations. The reference duration is selected as greater than the maximum duration value.

14 Claims, 3 Drawing Sheets

U.S. PATENT DOCUMENTS

| | | | |
|---|---|---|---|
| 7,376,391 B2 * | 5/2008 | Friedrich et al. | 455/41.1 |
| 2004/0213169 A1 * | 10/2004 | Allard et al. | 370/276 |
| 2005/0053024 A1 * | 3/2005 | Friedrich | 370/313 |
| 2005/0056704 A1 * | 3/2005 | Kim | 235/492 |
| 2005/0225447 A1 | 10/2005 | Diorio et al. | |
| 2005/0237162 A1 | 10/2005 | Hyde et al. | |

FOREIGN PATENT DOCUMENTS

| | | |
|---|---|---|
| DE | 198 27 476 C1 | 9/1999 |
| DE | 101 38 218 A1 | 2/2003 |

* cited by examiner

METHOD FOR WIRELESS DATA TRANSMISSION BETWEEN A BASE STATION AND A TRANSPONDER VIA INDUCTIVE COUPLING

This nonprovisional application claims priority under 35 U.S.C. §119(a) on German Patent Application No. DE 102006007262, which was filed in Germany on Feb. 10, 2006 and which is herein incorporated by reference.

BACKGROUND OF THE INVENTION

1. Field of the Invention

The present invention relates to a method for wireless data transmission between a base station and a transponder by means of inductive coupling.

2. Description of the Background Art

Contactless identification systems or so-called radio-frequency-identification (RFID) systems typically include a base station or a reading device or a reading unit and a plurality of transponders or remote sensors. The transponders or their transmitting and receiving devices typically do not have an active transmitter for data transmission to the base station. Such inactive systems are called passive systems when they do not have their own power supply, and semipassive systems when they have their own power supply. Passive transponders draw the power necessary for their supply from the electromagnetic field emitted by the base station.

For data transmission between the transponder and the base station, for a programming operation of the transponder, for example, the transponder has an interface of a specific interface type, which is compatible with the corresponding interface type of the base station. The interface types can be divided, in a preliminary rough grouping, into contact and contactless types.

The interface types with which the data transmission occurs contactless or contact-free differ, inter alia, in the operating or carrier frequency used for the data transmission, i.e., the frequency transmitted by the base station. Frequently used frequencies are, for instance, 125 kHz (LF range), 13.56 MHz (RF range), a frequency range between 860 MHz to 960 MHz (UHF range), and a frequency range greater than 3 GHz (microwave range).

Another differentiating feature of the different interface types is the type of coupling between the specific interfaces of the transponder and the base station. In this case, inter alia, the so-called inductive or magnetic coupling and the so-called far-field coupling are differentiated. Described in simplified terms, in inductive or near-field coupling, an antenna coil of the base station and an antenna coil connected to the input circuit of the transponder form a transformer, which is why this type of coupling is also called a transformer coupling. In inductive coupling, a maximum distance between the transponder and the base station is limited to the near field of the employed antenna. The near-field range is substantially established by the operating frequency of the interface.

The so-called load modulation is usually used in inductive coupling for data transmission from a transponder to a base station; in this regard, see, for example, Finkenzeller, Chapter 3.2.1.2.1 "Load Modulation."

For data transmission from the base station to the transponder, in inductive coupling the base station usually transmits a carrier signal with a frequency in a frequency range of 50 kHz to 250 kHz. To begin the data transmission, the base station via amplitude modulation of the carrier signal first generates a short field gap or a so-called "gap"; i.e., the amplitude of the carrier signal is damped or attenuated briefly, for example, for about 50 μs to 400 μs, or totally suppressed.

Characters which are transmitted subsequent to the initiation of the data transmission by the base station are encoded by the associated durations between temporally successive field gaps. A first character value is hereby assigned a first duration and at least one second character value is assigned a second duration. To decode the transmitted characters, the transponder determines the specific durations between the field gaps and determines the value of the transmitted character from the determined duration.

For error-free data transmission or decoding of the characters, it is necessary that the signal courses generated by the base station and received by the transponder by inductive coupling have established maximum tolerances, for example, in regard to their time course and/or employed level.

To increase the achievable ranges between base station and passive transponders, the quality of a parallel resonant circuit, which is formed here by the antenna coil and a capacitor connected parallel thereto, is increased in order to enable the supplying of the passive transponder from the field transmitted by the base station at greater distances as well. The reduced damping of the resonant circuit has the effect that at a field gap the coil voltage or the voltage of the parallel resonant circuit of the transponder declines more slowly than in the case of a resonant circuit with a lower quality and therefore higher damping. Because the field gap in the transponder can be detected, however, only when the coil voltage or a voltage obtained from the coil voltage by rectification has declined below a settable potential, field gaps can be detected in a delayed manner in comparison with a resonant circuit with a lower quality. This has the result that the duration of the field gaps detected in the transponder are shortened and the durations between the field gaps, which represent the corresponding character value, are lengthened. This change in the timing of the signal courses detected in the transponder is influenced directly by the quality of the resonant circuit. In other words, the timing of the signals received in the transponder substantially depend on various parameters, for example, on the employed antenna coil, as a result of which an error-free data transmission cannot always be guaranteed in the case of changes in parameters.

In a conventional system, to be able to ensure interference-free data transmission also in the case of such parameter-dependent timing variations, after the initiation of the data transmission, a reference duration is transmitted by successive field gaps by the base station, with which a calibration value is determined in the transponder, whereby the calibration value is used for calibrating the subsequently received durations. The reference duration in this case corresponds to a known character value, for instance, "0". Because it is known in the transponder how long the duration belonging to the character value "0" must be theoretically, the calibration or offset value can be calculated from the actual, measured reference duration.

However, this method cannot be carried out with transponders not supporting this method or this transmission protocol, because these interpret the reference duration already as a character, as a result of which the character sequence received in the transponder is corrupted.

German Patent Publication DE 198 27 476 C1 discloses a method in which after an HF charge pulse two reference pulses are transmitted, of which the one with a longer duration represents an H-bit and the other with the shorter duration an L-bit.

Unexamined German Patent Application DE 197 44 781 C1, which corresponds to U.S. Pat. No. 6,044,333 discloses a method for calibrating an RC oscillator of a transponder, in which a data set is expanded by a calibration signal to calculate a correction value.

SUMMARY OF THE INVENTION

It is therefore an object of the present invention to provide a method for wireless data transmission between a base station and a transponder by means of inductive coupling, which, in one respect, makes possible interference-free data transmission in the case of parameter-dependent timing variations and can be carried out simultaneously also with transponders which have no calibration mechanism to compensate for the timing variations.

The method of the invention can be carried out with transponders that support a first data transmission protocol type and/or a second data transmission protocol type. Independent of the data transmission protocol type, the base station transmits a carrier signal with a frequency within a frequency range of 50 KHz to 250 KHz, a data transmission is initiated by the base station by generating a field gap of the carrier signal, characters which are transmitted by the base station to the transponder are encoded by associated durations between the temporally successive field gaps, a first character value is assigned a first duration, and at least one second character value is assigned a second duration. In the first data transmission protocol type, the data transmission is ended when a maximum value for a duration between successive field gaps is exceeded. In the second data transmission protocol type, after the initiation of the data transmission, a reference duration is transmitted by the base station, by means of which a calibration value is determined in the transponder, whereby the calibration value is used for calibrating the successively received durations. The reference duration is selected as greater than the maximum duration value and the data transmission is ended when a duration determined after the reference duration exceeds the maximum duration value. The data transmission according to both data transmission protocol types is initiated by the transmission of a first field gap. Transponders, which exclusively support the first data transmission protocol type, after the transmission of the first field gap by the base station thus enter a ready-to-receive state and wait for a further or second field gap at a time interval to the first field gap, which corresponds to an associated valid character value. The selection of the reference duration greater than the maximum duration value has the effect that the transponders that support exclusively the first data transmission protocol type, during the transmission of the reference duration, end the data transmission after the elapse of maximum duration value, i.e., set their ready-to-receive state and reset their receive logic. If the second field gap is now transmitted, which marks the end of the reference duration and the beginning of the transmission of the first character or useful datum to be transmitted, the transponder interprets this as a new initiation of the data transmission. Because the first and the second data transmission protocol type do not differ in the subsequent protocol course (i.e., the character values in particular associated with the different durations are identical), the transponder of the first data transmission protocol type also receives data that are transmitted according to the second data transmission protocol type, because the transmission of the reference duration leads only to the resetting of the ready-to-receive state in the transponder. In this way, data can be exchanged using both transponders of the second data transmission protocol type and transponders of the first data transmission protocol type; i.e., the data transmission protocol is downward compatible.

In an embodiment, the first duration, the second duration, and/or the reference duration are determined in the transponder by counting the oscillations of the carrier signal. In this way, a cycle duration of the carrier signal can be used as a time base; i.e., a transponder-internal clock generator is not necessary.

In an embodiment, monitoring occurs in the transponder whether a duration between the field gap for initiating the data transmission and a subsequent field gap lies within at least one settable time interval. If this duration lies within the time interval, a decoding of the received character is carried out based on the first data transmission protocol type. This is appropriate particularly for transponders that support both the first and also the second data transmission protocol type. If, for example, a base station, which supports only the first data transmission protocol type, wishes to carry out a data transmission with this type of transponder, for example, in order to write the transponder, it transmits directly the first useful datum or useful character of the data to be transmitted before transmitting a reference duration for calibration. The transponder now detects from the length or the duration between the first two field gaps whether this is a reference duration or already a useful datum to be transmitted, because the reference duration is much longer than the duration used for encoding a character value. If the transponder now detects that no reference duration is transmitted, i.e., that the base station is using the first data transmission protocol type, the transponder activates the first data transmission protocol type. In this case, the decoding of the received characters or data in the transponder is begun immediately, i.e., without prior calibration by evaluating the reference duration. This makes it possible to use transponders of the second data transmission protocol type with base stations that implement only the first data transmission protocol type. In this case, base stations of any data transmission protocol type can communicate with transponders of any data transmission protocol type.

The first character value can be "0" and the second character value "1". In this way, a bit value can be precisely encoded with an associated duration. Preferably, in binary notation, a third character value is "10" and a fourth character value "11". In this way, four different bit combinations can be encoded with a total of four distinguishable durations.

In an embodiment, the calibration value can be stored in the form of a counter value and a counter, used for duration determination, is preloaded at the beginning of a duration measurement with the counter value. To determine the calibration value, for example, a counter with a predefined bit width can be used, which at the beginning of the data transmission is set to an initial value, for example, zero. During the reference duration, the counter is incremented in the cycle of the carrier signal oscillation, whereby a counter overflow can also occur. The count at the end of the reference duration, i.e., in the second field gap, for instance, provided with a negative sign, can then be used as a starting value of the counter in the duration determination in the course of character decoding. In this case, in the field gap that marks the beginning of a character encoding, the stored starting value is loaded into the counter and the counter is incremented until the subsequent field gap is detected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
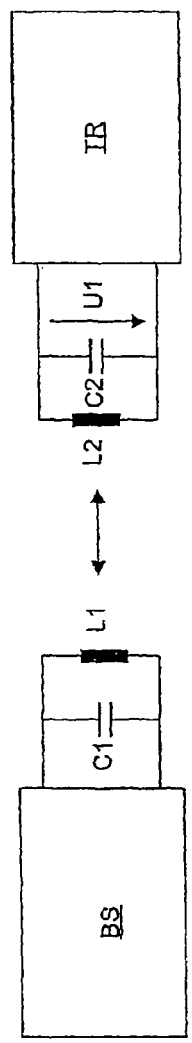
FIG. 1 illustrates an RFID system with a base station and a transponder, according to an embodiment of the present invention.

FIG. 1 shows an RFID system with a base station BS and a passive transponder TR. For data transmission by means of inductive coupling, the base station BS includes an antenna coil L1 and a capacitor C1. The transponder TR accordingly also has an antenna coil L2 and a capacitor C2. Antenna coils L1 and L2 form a transformer in a near field of the specific antenna coils L1 and L2.

For data transmission from the base station BS to the transponder TR, the base station BS generates a carrier signal with a frequency of 125 kHz, whose amplitude is totally suppressed for generating field gaps. The data transmission from transponder TR to base station BS occurs by means of load modulation.

Figure 2:
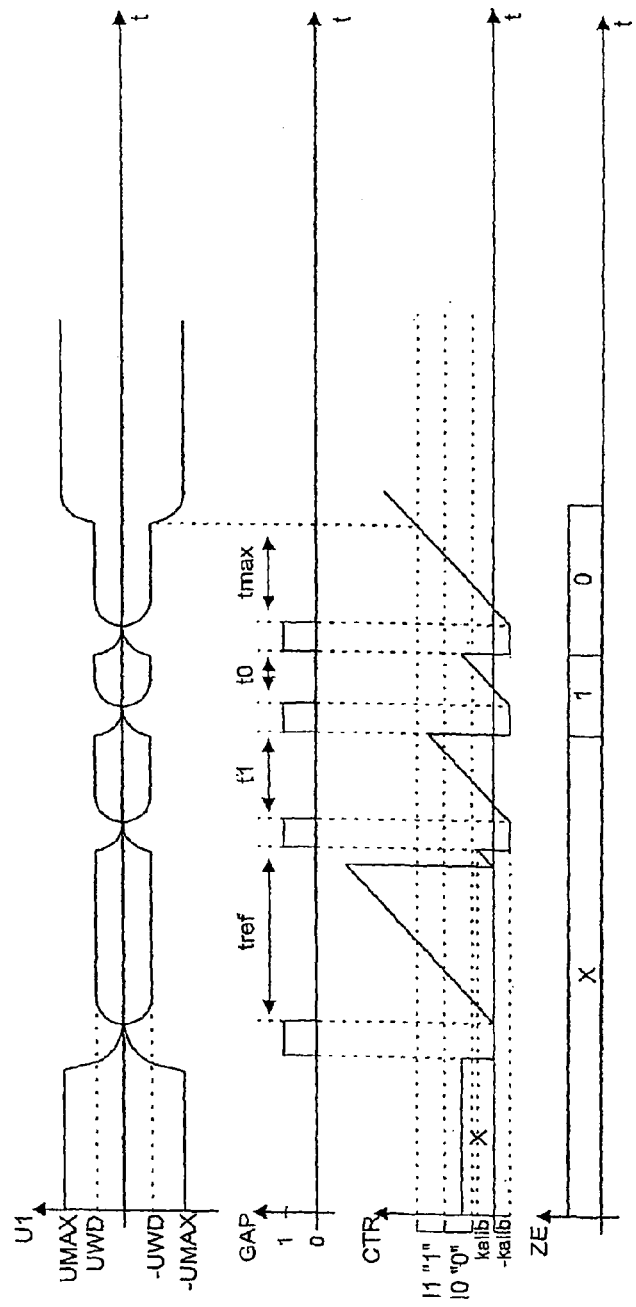
FIG. 2 shows time response diagrams of signals during a data transmission of the invention from the base station to the transponder of FIG. 1, whereby the transponder supports both a first data transmission protocol type and a second data transmission protocol type and the base station transmits a reference duration.

FIG. 2 shows response diagrams of signals during a data transmission of the invention from the base station BS to the transponder TR of FIG. 1, whereby the transponder TR supports both a first data transmission protocol type and a second data transmission protocol type and at the start of the data transmission the base station BS transmits a reference duration "tref."

Before the data transmission, base station BS by means of its antenna coil L1 generates a magnetic alternating field with a frequency of 125 kHz, which due to the inductive coupling induces an alternating voltage U1 in antenna coil L2 of the transponder TR, whereby only the envelope curve of the alternating voltage U1 is shown in FIG. 2. An amplitude of the alternating voltage U1 is limited or clamped to a maximum voltage UMAX by clamp diodes (not shown) of the transponder TR.

To initiate the data transmission within the scope of a write access operation to the transponder TR, the base station BS generates a field gap or a gap by suppressing the carrier signal. Because of the high quality of the parallel resonant circuit, however, the voltage U1 falls only slowly along the envelope curve. The course of the voltage U1 is evaluated in the transponder TR. When the voltage U1 falls below an internal threshold value for the first time, an active signal GAP is generated transponder-internally. The signal GAP activated for the first time has the effect that the maximum voltage U1 is limited or clamped to a value UWD which is lower than the value UMAX. The voltage limitation to the value UWD occurs in the transponder TR typically in that a threshold voltage element is short-circuited by a parallel-connected switching element.

The voltage U1 is limited to the value UWD until an end of the data transmission is detected in the transponder TR. The end of the data transmission is detected in the transponder TR when a maximum duration value tmax between successive field gaps or gaps has been exceeded.

After the first field gap is generated, a transponder-internal counter CTR is initialized from a previously undefined counter value "X" to a counter value of "0." The counter or the counter value CTR is incremented after this beginning at the falling edge of the first gap signal in the cycle or in each new period of the carrier signal. The reference duration tref, i.e., the duration between the falling edge of the first gap signal and the rising edge of the successive second gap signal, is so large in the exemplary embodiment shown in FIG. 2 that the counter value CTR runs over once and starts again with the counter value "0." In the case of the rising edge of the second gap signal, the counter has a counter value "calib" which, having a negative sign, is used as the starting value of the counter during the subsequent duration measurements.

In the case of the falling edge of the second gap signal, the counter CTR is incremented in the cycle of the carrier signal beginning at a value "−calib." In the case of the rising edge of the third gap signal, the counter value CTR is read and the range of the read counter value is checked. The counter value CTR is within a value range or interval, which corresponds to a character value of "1," i.e., to a duration "t1," which is used by the base station for encoding a character with the value "1."

After counter value CTR is read, the counter CTR is again preloaded with the calibration value "−calib." In the case of the falling edge of the third gap signal, the counter CTR is incremented in the cycle of the carrier signal beginning at the value "−calib. In the case of the rising edge of the fourth gap signal, the counter value CTR is read and the range of the read counter value is checked. The counter value CTR is within a value range or interval, which corresponds to a character value of "0," i.e., to a duration "t0," which is used by the base station for encoding a character with the value "0."

The character values decoded in the transponder TR are shown in the lower diagram of FIG. 2. The character "X" in this case represents an undefined character value.

Because the base station BS in the shown exemplary embodiment transmits only the exemplary bit sequence "10" to the transponder TR, no additional field gaps are generated after the fourth field gap within the scope of the data transmission. In other words, in the case of the falling edge of the fourth gap signal, the counter CTR is incremented in the cycle of the carrier signal again beginning at the value "−calib." When the counter value CTR leaves the interval assigned to the character value "1," the transponder TR detects that the maximum duration value tmax between successive field gaps has been exceeded and ends the current data transmission, i.e., resets its receiving unit. This has the effect, inter alia, that the maximum value of the voltage U1 is again raised to UMAX, because the bridging of the threshold value element, causing the voltage limitation to UWD, is again separated.

The transponder TR can again receive data in a subsequent data transmission procedure. Owing to the calibration of the duration measurement by means of the reference duration, timing variations in the detected gap signals, for instance, due to different qualities of antenna coil L2 of different transponders, can be compensated.

Figure 3:
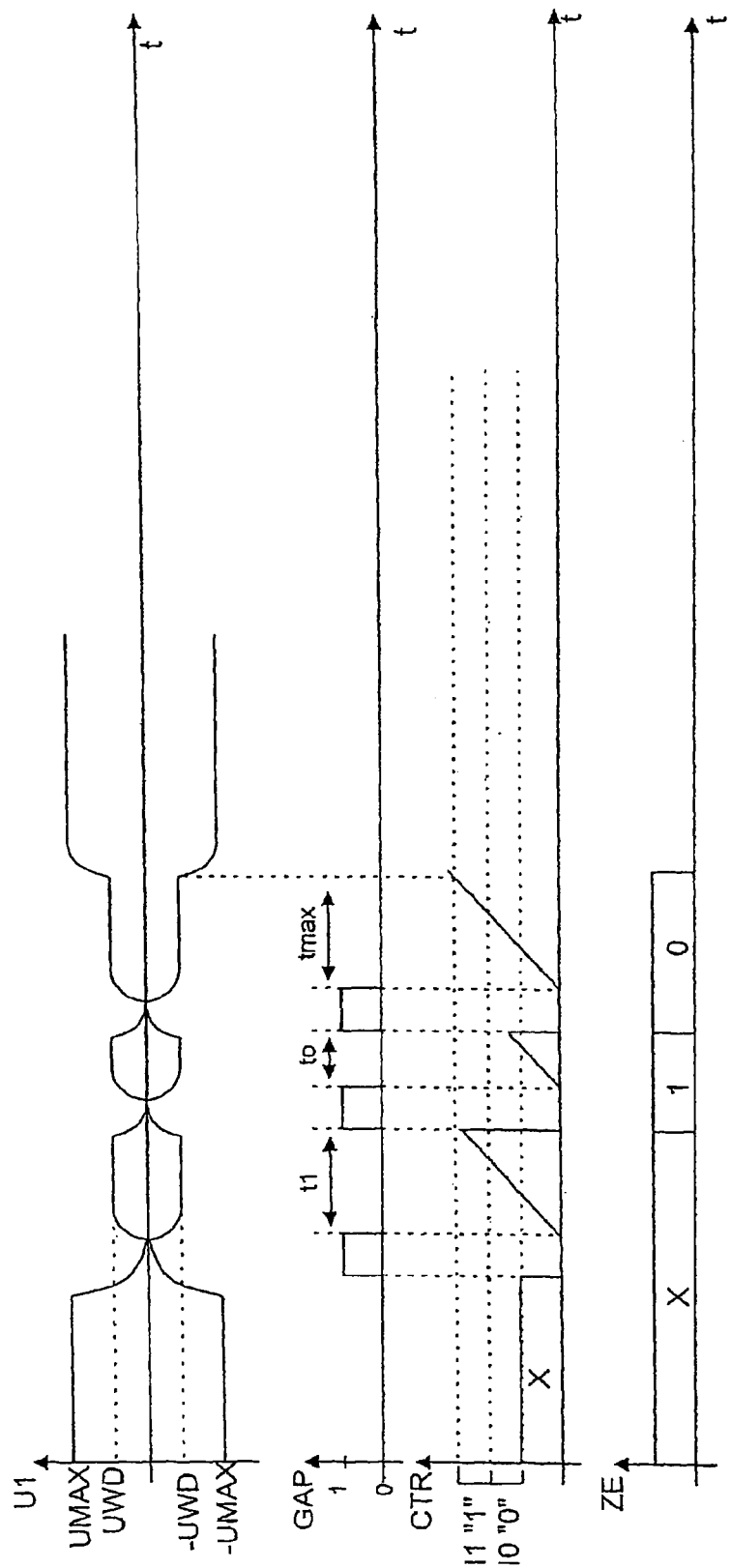
FIG. 3 shows time response diagrams of signals during a data transmission of the invention from the base station to the transponder of FIG. 1, whereby the transponder supports both the first data transmission protocol type and the second data transmission protocol type and the base station does not transmit a reference duration.

FIG. 3 shows response diagrams of signals for a case in which the transponder supports both the first data transmission protocol type and the second data transmission protocol type and the base station does not transmit a reference duration "tref."

After the generation of the first field gap by the base station, as in the previously described example, the transponder-internal counter CTR is initialized from the previously undefined counter value "X" to the counter value "0." The counter or the counter value CTR is incremented after this beginning at the falling edge of the first gap signal in the cycle or in each new period of the carrier signal. In the rising edge of the second gap signal, the counter has a counter value which is within a range that corresponds to a character value of "1." The result is that the duration between the field gap for initiating the data transmission and the following field gap lies within a time interval used for encoding the character to be transmitted. In the example of FIG. 2, the respective counter value "calib" does not lie within an interval or time interval used for encoding. The transponder TR can therefore detect from the counter state whether a reference duration for calibration or directly a character to be transmitted is sent by the base station BS, i.e., which data transmission protocol type the base station supports.

If the transponder detects that the base station supports the first data transmission protocol type, the received data or characters are also decoded using the first data transmission protocol type. In this way, an automated protocol switching in the transponder TR is possible, when it supports both data transmission protocol types.

Figure 4:
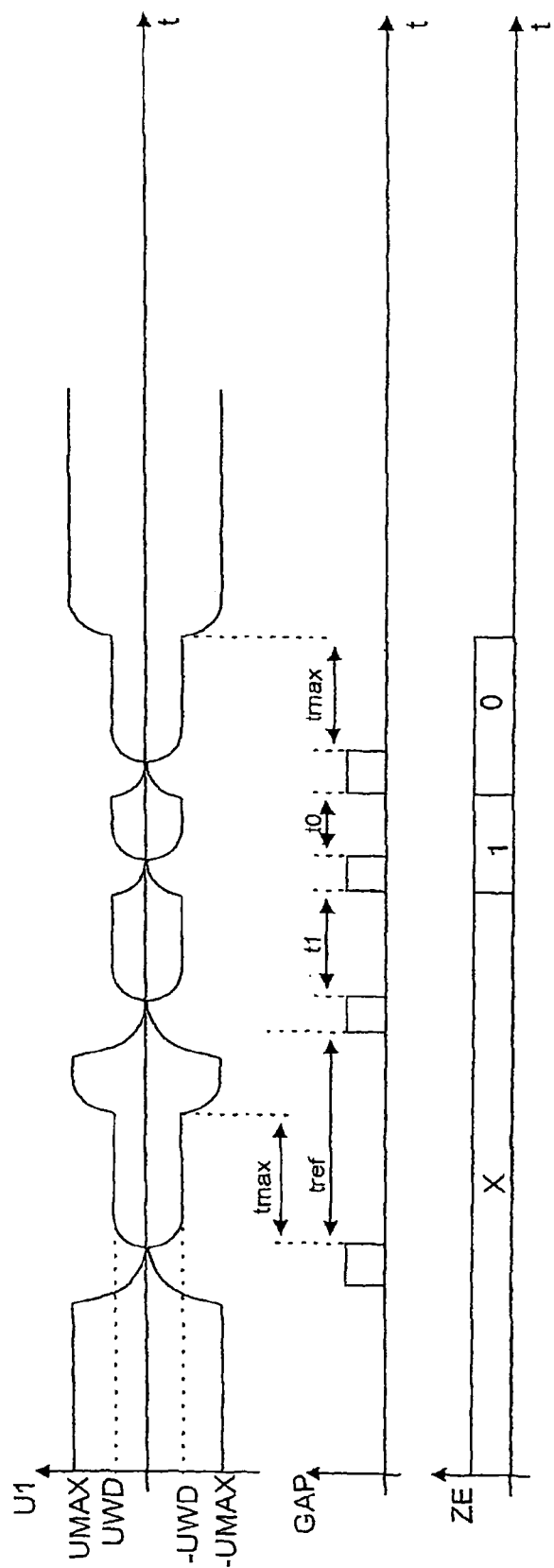
FIG. 4 shows time response diagrams of signals during a data transmission of the invention from the base station to the transponder of FIG. 1, whereby the transponder supports only the first data transmission protocol type and the base station transmits a reference duration.

FIG. 4 shows response diagrams of signals, when the transponder TR supports only the first data transmission protocol type and the base station transmits the reference duration, i.e., operates according to the second data transmission protocol type.

The data transmission is initiated as described above by the generation of the first field gap. The transponder TR then monitors the duration until the next field gap is detected. However, because the next field gap or the next rising edge of the gap signal is generated only after the duration "tref," whereby the duration "tref" is greater than the maximum duration value "tmax," the transponder TR resets its receiving unit after the duration tmax and ends the current data transmission. This becomes clear from the increase in the maximum value of the voltage U1 to the value UMAX. The transponder TR is then again in a ready-to-receive state and detects and properly decodes the subsequently transmitted characters, because the durations "t0" or "t1" assigned to the character values "0" and "1" are independent of the data transmission protocol type.

The shown embodiments make possible, in one respect, interference-free data transmission during parameter-dependent timing variations with use of the second data transmission protocol type, provided the transponders, which support both the first and the second data transmission protocol type, are located within the response range of a base station, which also supports the second data transmission protocol type. At the same time, the data transmission method can also be carried out with transponders which have no calibration mechanisms for compensating for timing variations. It is possible, furthermore, to operate transponders supporting both data transmission protocol types also with base stations that support only the first data transmission protocol type. Therefore, there is both a downward and upward compatibility.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and a transponder via inductive coupling, the transponder supporting a first data transmission protocol type or a second data transmission protocol type, the method comprising:
    transmitting by the base station a carrier signal;
    initiating a data transmission by the base station according to the second data transmission protocol by generating a field gap of the carrier signal; and
    encoding characters, which are transmitted by the base station to the transponder, by associated durations between temporally successive field gaps, a first character value being assigned a first duration, and at least one second character value being assigned a second duration, wherein each of said first duration and second duration are shorter than a maximum duration value,
    wherein, for a transponder supporting the first data transmission protocol type, the data transmission is ended when a duration between successive field gaps exceeds said maximum duration value,
    wherein, for a transponder supporting the second data transmission protocol type, after the initiation of the data transmission, a reference duration transmitted by the base station is used by the transponder to determine a calibration value in the transponder, the calibration value being then used for calibrating the subsequently received durations,
    wherein the reference duration is selected as being greater than said maximum duration value, and
    wherein the data transmission is ended when a duration determined after the reference duration exceeds said maximum duration value.

2. The method according to claim 1, wherein the first duration, the second duration, or the reference duration is determined in the transponder by counting oscillations of the carrier signal.

3. The method according to claim 1, wherein a transponder supporting both the first and the second transmission protocol type receives the data transmission and performs a monitoring of whether a duration between the field gap for initiating the data transmission and a subsequent field gap lies within at least one settable time interval, and when this duration lies within the time interval performs a decoding of the received character based on the first data transmission protocol type.

4. The method according to claim 1, wherein the first character value is "0" and the second character value is "1."

5. The method according to claim 4, wherein in binary notation of a third character value is "10" and a fourth character value is "11."

6. The method according to claim 1, wherein the calibration value is stored as counter value, and wherein a counter that is used for determining the duration is preloaded at a beginning of the duration measurement with the counter value.

7. The method according to claim 1, wherein the base station steps of transmitting, initiating, or encoding are independent of the first and the second data transmission protocol types supported by the transponders.

8. The method according to claim 1, wherein the carrier signal is transmitted within a frequency range of 50 KHz to 250 KHz.

9. A transponder comprising:
an antenna inductor; and
a capacitor being operatively connected to the antenna inductor, the transponder supporting a first data transmission protocol type or a second data transmission protocol type,
initiating a data transmission by the base station according to the second data transmission protocol by generating a field gap of the carrier signal; and
wherein a data transmission according to the second data transmission protocol is initiated by a base station generating a field gap in a carrier signal,
wherein characters, which are transmitted by the base station to the transponder, are encoded by associated durations between temporally successive field gaps, a first character value being assigned a first duration, and at least one second character value being assigned a second duration, each of said first duration and second duration being shorter than a maximum duration value,
wherein, in the first data transmission protocol type, the data transmission is ended when a duration between successive field gaps exceeds said maximum duration value,
wherein, in the second data transmission protocol type, after the initiation of the data transmission, a reference duration is transmitted by the base station by which a calibration value is determined in the transponder, the calibration value being used for calibrating the subsequently received durations,
wherein the reference duration is selected as being greater than said maximum duration value, and
wherein the data transmission is ended when a duration determined after the reference duration exceeds said maximum duration value.

10. The transponder according to claim 9, wherein the transponder is a passive transponder.

11. The transponder according to claim 10, wherein the transponder receives energy from a signal transmitted by a base station.

12. The transponder according to claim 9, wherein the transponder transmits data wirelessly to the base station via inductive coupling.

13. A transponder system comprising:
at least one transponder configured to support communication according to a first data transmission protocol type;
a base station to generate a data transmission according to a second protocol type, said data transmission having, in temporal sequence, a reference pulse followed by at least one character pulse, each of said pulses having associated durations between temporally successive field gaps, said reference pulse having a duration greater than a maximum value, and said character pulse encoding a first character as a first duration and a second character as a second duration, each of said first and second durations being less than said maximum value,
wherein the at least one transponder configured to support the first data transmission protocol type, upon receiving the data transmission according to the second data transmission protocol type, determines the reference pulse as an end of transmission pulse, and determines a first field gap succeeding said reference pulse as a first of said character pulses of said data transmission.

14. The transponder system according to claim 13, wherein the transponder is configurable to support communication according to the first data transmission protocol type and the second data transmission protocol type, and wherein the transponder, upon receiving said data transmission determines said reference pulse duration as a calibration value and, in response, performs a calibration for subsequently received pulse durations, based on said calibration value.

* * * * *